United States Patent [19]

Schindler et al.

[11] 4,267,407
[45] May 12, 1981

[54] METHOD AND APPARATUS FOR THE TRANSMISSION OF SPEECH SIGNALS

[75] Inventors: Hans R. Schindler; Peter Vettiger, both of Langnau, Switzerland

[73] Assignee: IBM Corporation, Armonk, N.Y.

[21] Appl. No.: 79,412

[22] Filed: Sep. 27, 1979

[30] Foreign Application Priority Data

Oct. 27, 1978 [CH] Switzerland .............. 11115/78

[51] Int. Cl.³ .................. H04J 6/02; G10L 1/10
[52] U.S. Cl. .............. 179/15.55 R; 179/15.55 T; 179/1 SM; 370/81
[58] Field of Search ......... 179/1 SA, 1 SM, 15.55 R, 179/15.55 T; 358/133, 135, 260, 261; 364/728; 370/79, 80, 112, 81

[56] References Cited

U.S. PATENT DOCUMENTS

| 3,641,496 | 2/1972 | Slavin | 179/1 SM |
| 4,009,343 | 2/1977 | Markey et al. | 179/15 BS |
| 4,032,719 | 6/1977 | Blasbalg | 179/15 AS |
| 4,052,563 | 10/1977 | Noda et al. | 179/1 SA |
| 4,140,876 | 2/1979 | Gagnon | 179/1 SA |

OTHER PUBLICATIONS

J. Sciulli et al., "A Speech Predictive Encoding Comm. System etc.", IEEE Trans. Comm., pp. 827-835.
A. Frei et al., "Adaptive Predictive Speech Coding etc.", IEEE Proc. Int'l. Conf. Comm's., 1973, pp. 46-12 to 46-16.

Primary Examiner—Charles E. Atkinson
Assistant Examiner—E. S. Kemeny
Attorney, Agent, or Firm—John E. Hoel

[57] ABSTRACT

For the multiplex transmission of coded speech signals in periodic frames, single segments (blocks of coded samples) are selectively suppressed for redundancy reduction, and are replaced on the receiver side by optimally correlated subsections of equal length from previously transmitted segments. On the transmitter side, a multiplicity of compare operations are made for each speech signal, between the respective newest coded segment and a step wise shifted subsection window of previous segments, to determine the best correlated subsection, i.e. the one which is most suitable as replacement and the respective relative offset and correlation. From a group of speech signals, the one signal, or several signals, having the best correlation is selected for suppression of a segment before transmission. Instead of each missing segment an indication of the corresponding optimum offset is transmitted in the frame header. In the receiver for each speech signal a few previous segments are kept in storage from which then, with the aid of the received offset indication the optimally suited subsection can be selected and used as replacement.

8 Claims, 8 Drawing Figures

FIG. 1
SPEECH SEGMENT SUPPRESSION AND REINSERTION

FIG. 2
CORRELATION OPERATIONS

FIG. 4

FIG. 6
TRANSMITTER

FIG. 5

FIG. 7 RECEIVER

FIG. 8 STORAGE AND CONTROL 94

$a = S(OPT) = S(OPT)' + 192$
$b = \overline{S(OPT)'} \cdot 8q + r$

METHOD AND APPARATUS FOR THE TRANSMISSION OF SPEECH SIGNALS

FIELD OF THE INVENTION

The invention disclosed broadly relates to communications systems, and more particularly relates to an apparatus and method for reducing the redundancy in the multiplex transmission of coded speech signals in periodic frames.

BACKGROUND OF THE INVENTION

Because normal speech signals include much redundancy, as well as intervals without any information, an increased utilization of the transmission capacity of available channels can be achieved by a reduction of the unnecessary signal components. As a possible result fewer multiplex channels, i.e. time slots in periodic time frames, are required on a trunk line than the total number of speech signals that must be transmitted.

Numerous methods and arrangements for redundancy reduction are known in the art. In one of these methods, a trunk channel is only assigned for the duration of one period (e.g. 6 ms) to those of all connected voice input channels on which presently an "active" speech signal is received. As soon as a talker becomes silent the input channel is deprived of the trunk channel. Systems in which this method is used are disclosed in U.S. Pat. Nos. 4,032,719, 4,009,343 and 3,664,680, and also in a publication by K. Bullington, et al., "Engineering Aspects of TASI," *Bell System Technical Journal*, March, 1959, pp. 353–364. One problem dealing with the methods employing activity-controlled compression is the so-called "freezout", occuring during very high system utilization which means that to some of the speech signals, temporarily no trunk channel can be assigned despite an active status. Furthermore, delays can occur when a trunk channel is to be newly assigned after a pause. These phenomena may finally result in a reduction of speech quality. Furthermore, activity detectors are required for all input channels when this method is employed.

Another possibility for a reduction of the required transmission channel capacity is as follows: In the coded transmission of speech signals those samples are omitted, which are equal or very similar to the last-previous transmitted sample, and in the receiver the last-previous transmitted sample is used once again or even several times. Methods employing this principle were disclosed in the following publications:

R. Woitowitz: Ein Redundanzminderndes Sprachmultiplexverfahren Mit Momentaner Prioritatszuteilung. *Proceedings*, 1974, International Zurich Seminar on Digital Communications, Paper A3.

J. A. Sciulli et al.: A Speech Predictive Encoding Communication System for Multichannel Telephony, *IEEE Transactions on Communications*, Vol. COM-21 (1973), pp. 827–835.

Means for detecting equality or similarity of single coded samples, and for storing and reinserting previous samples in the receiver employing these techniques, are relatively simple. Since, however, omission and reinsertion is effected for single samples only, the signalling information which is required for utilization of the released time slots must be transmitted in each sampling interval in the form of assignment masks or addresses. This requires a significant portion of the channel capacity (in one case 25%) so that the gain in transmission capacity which is possible by redundancy reduction is drastically reduced. Furthermore, signals having large signal amplitudes are preferred by these methods which are based on the handling of single samples.

The paper "Adaptive Predictive Speech Coding Based on Pitch-Controlled Interruption/Reiteration Techniques" by A. Frei et al., published in the *Proceedings of the IEEE*, 1973, International Conference on Communications, pp. 46-12 through 46-16, discloses a method in which, for the transmission of voiced portions of a speech signal, only one pitch period is transmitted as delta-coded signal, and in which this signal section of variable length is stored in the receiver in a shift register and is repeated several times for obtaining the output signal. The required information for the pitch period is obtained by a specific correlator which compares a delta-coded signal subsection (window) with a delayed subsection of the same signal. (Such a pitch period detector is also described in Swiss Pat. No. 549,849.) This transmission method has the disadvantage that sections of variable length must be handled, because the pitch period and thus the length of the signal interval to be transmitted as well as the working length of the shift register are varying. This fact can be tolerated for the transmission of single signals, but not for the time division multiplex transmission of speech signals in synchronous operation (time frames of fixed length). Other disadvantages are the occurence of echo-like effects at high repetition rates and of rumble distortions due to transient effects when the pitch frequency drifts.

OBJECTS OF THE INVENTION

It is, therefore, an object of the invention to devise a method and an arrangement for the transmission of speech signals, by which a redundancy reduction can be achieved which causes practically no distortion or modification of the transmitted signals.

A further object of the invention is a method in which only a small fraction of the transmission capacity, saved by redundancy reduction, is lost for the required additional signalling information.

Another object of the invention is a method which is suitable for time division multiplex operation with fixed length time frames and which allows the common utilization of required devices for a plurality of voice channels.

SUMMARY OF THE INVENTION

These and other objects, features, and advantages are achieved by the technique for speech compression in a multichannel voice communication system disclosed herein. For the multiplex transmission of coded speech signals in periodic frames, single segments (blocks of coded samples) are selectively suppressed for redundancy reduction, and are replaced on the receiver side by optimally correlated subsections of equal length from previously transmitted segments.

On the transmitter side, a multiplicity of compare operations are made for each speech signal, between the respective newest coded segment and a step wise shifted subsection window of previous segments to determine the best correlated subsection, i.e. the one which is most suitable as replacement and the respective relative offset and correlation.

From a group of speech signals, the one signal, or several signals, having the best correlation is selected for suppression of a segment before transmission. Instead of each missing segment an indication of the corresponding optimum offset is transmitted in the frame header. In the receiver for each speech signal a few previous segments are kept in storage from which then, with the aid of the received offset indication, the optimally suited subsection can be selected and used as replacement.

DESCRIPTION OF THE FIGURES

An embodiment of the invention is described in the following in connection with the drawings.

DISCUSSION OF THE PREFERRED EMBODIMENT

Principle of the Invention

Initially the principle of the method, which is the subject of the invention, will be described in connection with FIG. 1.

It is assumed that speech transmission occurs in segments of fixed length (duration), i.e. that according to a fixed time raster each signal portion is coded and transmitted (as a block). This is the case e.g. in satellite systems with a block length (time raster) of 6 ms. It is further assumed that a plurality of signals is transmitted over one line in time division multiplex.

Speech signals consist (at least for vowels) of periodic oscillations with a variable but only slowly changing pitch period, the duration of which depends on the respective sound and on the speaker.

The invention is based on the idea of selectively suppressing single signal portions (segments) during transmission in order to save transmission capacity, and to replace these suppressed segments at the receiving location by similar signal portions which were previously transmitted.

It is suggested by the invention to find for each newly assembled segment of the speech signal, by comparison, that signal section of equal length within the last two stored segments which has the best correlation C(MAX) with respect to the new segment, as well as the time offset $\Delta T = T(OPT)$ between this optimally correlated subsection and the new segment which is still to be transmitted. If necessary the new segment can be suppressed in the transmitted signal and can be replaced at the receiving location by a subsection of the previously transmitted signal. This requires only at the receiving location the storage of the two last previously transmitted speech signal segments, and the transmission of an indication for time offset $\Delta T = T(OPT)$.

Figure 1:
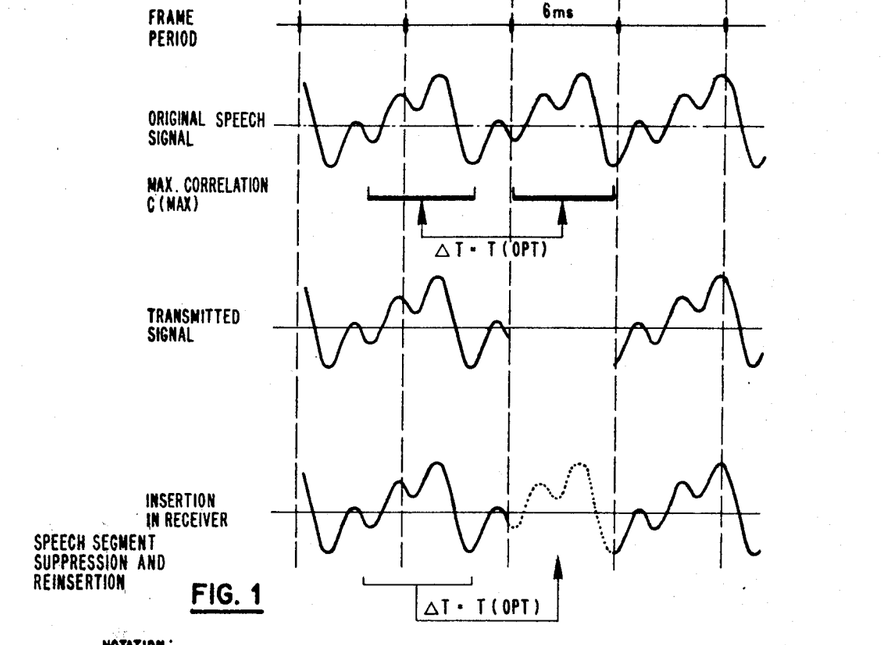
FIG. 1 shows speech signal diagrams illustrating the invented method for suppression and reinsertion of a segment.

The three operations (a) finding the optimally correlated signal subsection and determining T(OPT), (b) eliminating one segment during transmission, and (c) filling of the existing gap by a signal subsection which was previously transmitted, are schematically represented in FIG. 1.

According to the invention this solution is utilized in a system with multiplex transmission of a plurality of speech signals. For each new segment of each speech signal not only the time offset $\Delta T = T(OPT)$ is determined, but also a value for the correlation C(MAX) between the two signal intervals (the new segment and the optimum correlated older signal subsection). This allows to select for a segment suppression out of many signals those which currently have the best correlation, while the relatively worst correlated signals are transmitted without change, i.e. without suppression of a segment.

This means that in the solution, according to the invention for each single signal and for each frame period, the time offset T(OPT) for the optimum correlation C(MAX) is newly determined. In addition the sequence of correlation values C(MAX), according to their magnitude, is newly determined for each frame period for all of the signals which are transmitted in multiplex.

Correlation Procedures

In connection with FIG. 2 the comparison procedure for determining the signal subsection having maximum correlation and the respective time offset T(OPT), i.e. the pitch-period will now be explained for a single signal.

It is assumed that the speech signal is available in sampled, coded form (in the example: delta coding). Each segment of the speech signal which corresponds to a frame period of 6 ms comprises 192 sample values. The sample values being grouped in 24 bytes of eight bits each. The 192 bits which are available for each period of 6 ms thus allow a sampling rate of 32 kHz.

The newly coded speech segment must now be compared to a window or a signal subsection of equal length selected from the last two coded segments of the same signal, and after each comparison operation the window must be shifted by one step (1 bit). All together, 192 comparisons must be made during the first comparison. Block FR(n) is compared to block FR(n-2), and during the last comparison it is compared to a block which is almost equal to FR(n-1). By this comparison operation it is determined how many of the 192 bits in one block are equal to the corresponding bits in the other block. Full equivalence thus will result in a correlation value of 192, complete non-equality however, i.e. one block having all zeros, the other all ones, will result in a correlation value of zero.

The relations between comparison operation are illustrated by the following Table I.

TABLE I

| Comparison No. (i) | Time Offset <T | Offset S (Bit Count) | Normalized Offset S' | Correlation Value $C_i$ ($0 \leq C_i \leq 192$) |
|---|---|---|---|---|
| 1 | 12 ms | 384 | 192 | $C_1$ |
| 2 | (11+31/32) ms | 383 | 191 | $C_2$ |
| 3 | (11+30/32) ms | 382 | 190 | $C_3$ |
| . | . | . | . | . |
| 190 | (6+3/32) ms | 195 | 003 | $C_{190}$ |
| 191 | (6+2/32) ms | 194 | 002 | $C_{191}$ |
| 192 | (6+1/32) ms | 193 | 001 | $C_{192}$ |

Results of the correlation is thus a list of 192 different correlation values which correspond to the 192 possible time offsets ΔT, which can also be represented as bit offset (bit count) S. This correlation function has a distinct maximum, the position of which corresponds to the pitch period.

It is now possible to transmit, instead of the new speech signal segment, alternatively only an indication of the stored optimum offset value T(OPT), or S(OPT), respectively. In the latter case one has the possibility, in the receiver, to select from the two stored previous speech signal segments that subsection for filling the existing gap which correspond to this offset. It should optimally fill in the gap.

Embodiment

Figure 3:
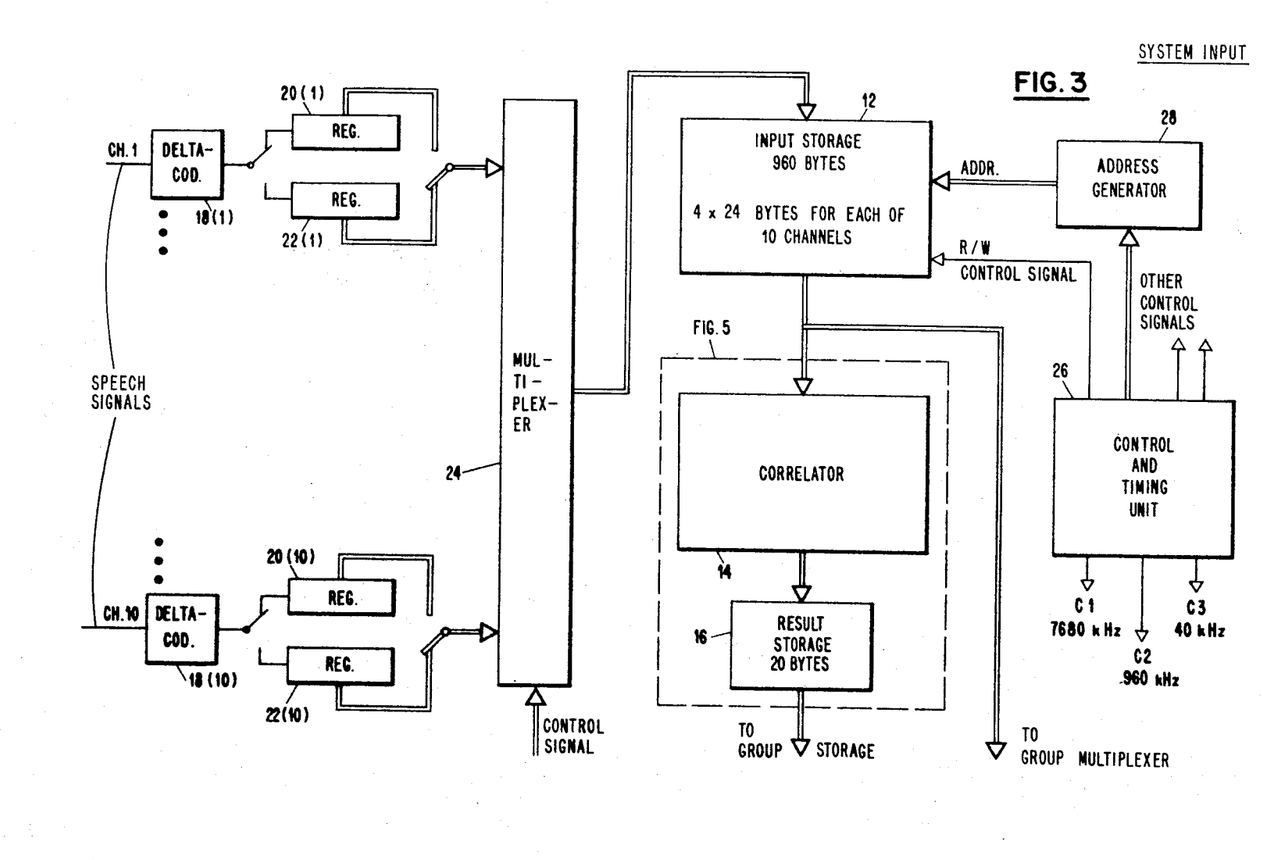
FIG. 3 shows a block diagram of an input arrangement including storage and correlation means for executing the method of the invention.

In connection with FIGS. 3 through 5 there will now be described an embodiment of a correlator which is used for a plurality of channels (in the example, ten) in time division multiplex. FIG. 3 shows, in a block diagram, the data flow from the ten channels, CH.1 ... CH.10 via a common input storage 12 and the correlator 14 to result storage 16. For each of the ten channels CH.1 ... CH.10 a delta coder 18 is provided, the output bit sequence of which is shifted alternatively into one of the two registers 20, 22. These registers are used as serial-parallel converters. The filled registers are connected through an 8-bit bus and a common multiplexer 24 to input storage 12 sequentially, for storing one byte per channel at a time. Addressing is effected by an address generator 28 which is connected to a control unit 26. The control unit 26 also generates three clock signals C1 ... C3 for storage access operations and for correlation operations.

The input storage can store for each of the ten channels four consecutive speech signal segments, i.e. the information corresponding to four time frames. As for each channel 192 bits, i.e. 24 bytes, are required per segment (time frame) a total capacity of 960 bytes is necessary. Because of practical reasons a block of 1024 bytes (1k byte) will be used, which is addressable by 10 bits.

While data for the next time frame n+1 are written into storage, one fetches from storage the values of the last written time frame n, for correlating them in correlator 14 with those of the two last previous time frames n−1 and n−2 which are still in storage. Addressing is effected also for this operation by addressing circuit 28.

The addressing sequence for writing is another one as for reading due to the following reason: The bytes furnished by the input channels must be continuously accepted, i.e. the input must be served cyclically. For evaluation, i.e. correlation, however, one has to use all accumulated values of a channel which belong to one time frame before one can proceed through the next channel (however, for the same time frame).

Figure 4:
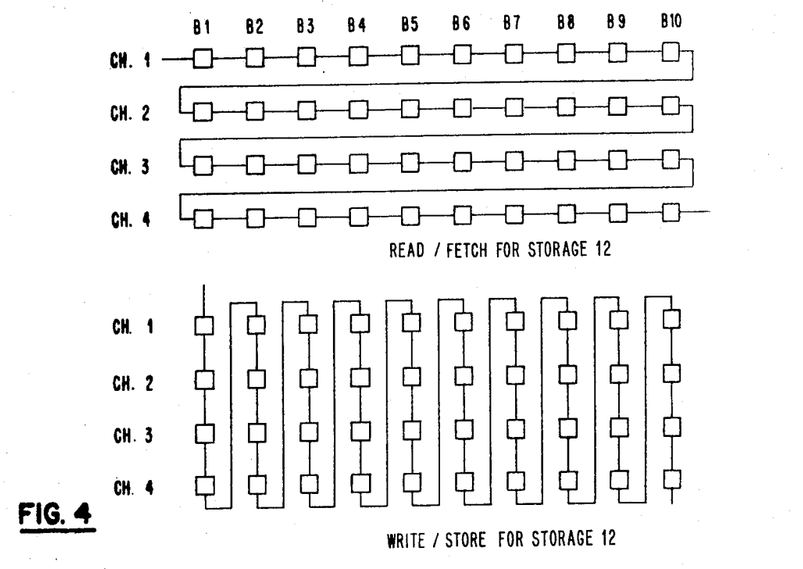
FIG. 4 shows diagrams illustrating the read and write sequences in the input storage of FIG. 3.

This is illustrated by FIG. 4 in which only four channels and ten bytes per frame and channel are shown. Thus for writing, one first stores the first byte for all channels, then the second byte for all channels and so on. For reading, however, one fetches sequentially all bytes for the first channel, then all bytes for the second channel and so on. As was said previously, the writing and reading procedures are executed in alternating manner, i.e. in a time shared fashion.

Figure 2:
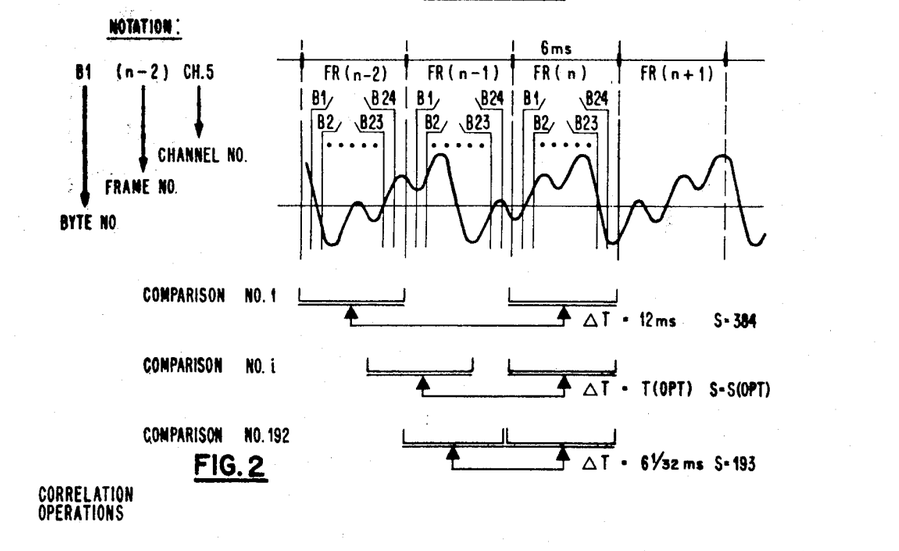
FIG. 2 shows speech signal diagrams illustrating the correlation operations.

The sequential and time relations during the correlation and storage operations will become apparent from the following Table II in connection with FIG. 2. The notation used for the single bytes is also shown in FIG. 2.

TABLE II

| CYCLE NO. | | | FETCHED BYTE COMPARED TO (192 COMPARISONS EACH WITH 8 BITS FROM 25 BYTES) | STORED BYTE |
|---|---|---|---|---|
| CHANNEL | BYTE | COMPARISON | | |
| 1 | 1 | 001...192 | B1 (n) CH.1<br>B1 (n−2) CH.1<br>B2 (n−2) CH.1<br>...<br>B23 (n−2) CH.1<br>B24 (n−2) CH.1<br>B1 (n−1) CH.1 | B1 (n+1) CH.1 |
| 1 | 2 | 193...384 | B2 (n) CH.1<br>B2 (n−2) CH.1<br>B3 (n−2) CH.1<br>...<br>B24 (n−2) CH.1<br>B1 (n−1) CH.1<br>B2 (n−2) CH.1 | B1 (n+1) CH.2 |
| 1 | 3 | 385...576 | B3 (n) CH.1<br>B3 (n−2) CH.1<br>...<br>B3 (n+1) CH.1 | B1 (n+1) CH.3 |
| 1 | 10 | 1729...1920 | B10 (n) CH.1<br>B10 (n−2) CH.1<br>... | B1 (n+1) CH.10 |

TABLE II-continued

| CYCLE NO. | | | FETCHED BYTE COMPARED TO (192 COMPARISONS EACH WITH 8 BITS FROM 25 BYTES) | STORED BYTE |
|---|---|---|---|---|
| CHANNEL | BYTE | COMPARISON | | |
| 1 | 11 | 1921...2112 | B10 (n−1) CH.1<br>B11 (n) CH.1<br>B11 (n−2) CH.1<br>...<br>B11 (n−1) CH.1 | B2 (n+1) CH.1 |
| . | . | | . | . |
| . | . | | . | . |
| . | . | | . | . |
| 1 | 24 | 4417...4608 | B24 (n) CH.1<br>B24 (n−2) CH.1<br>B1 (n−1) CH.1<br>...<br>B23 (n−1) CH.1<br>B24 (n−1) CH.1 | B3 (n+1) CH.4 |
| 2 | 1 | 001...192 | B1 (n) CH.2<br>B1 (n−2) CH.2<br>...<br>B1 (n−1) CH.2 | B3 (n+1) CH.5 |
| . | . | | . | . |
| . | . | | . | . |
| . | . | | . | . |
| 10 | 23 | 4225...4416 | B23 (n) CH.10<br>B23 (n−2) CH.10<br>B24 (n−2) CH.10<br>B1 (n−1) CH.10<br>...<br>B23 (n−1) CH.10 | B24 (n+1) CH.9 |
| 10 | 24 | 4417...4608 | B24 (n) CH.10<br>B24 (n−2) CH.10<br>B1 (n−1) CH.10<br>...<br>B24 (n−1) CH.10 | B24 (n+1) CH.10 |
| 1 | 1 | 001...192 | B1 (n+1) CH.1<br>B1 (n−1) CH.1<br>B2 (n−1) CH.1<br>...<br>B24 (n−1) CH.1<br>B1 (n) CH.1 | B1 (n+2) CH.1 |
| 1 | 2 | 193...384<br>193...384 | B2 (n+1) CH.1<br>...<br>B2 (n−1) CH.1<br>...<br>B2 (n) CH.1 | B1 (n+2) CH.2 |
| . | . | | . | |
| . | . | | . | |
| . | . | | . | |

Cycle Times (a) One channel cycle comprising 24 byte cycles each for 192 comparisons has a duration of 600 μs.

(b) One byte cycle comprising 192 comparisons has a duration of 25 μs (clock signal C3=40 kHz).

(c) Furnishing of another 8-bit-group, i.e. one byte each time after eight comparisons, i.e. all 1.04 μs (clock signal C2=960 kHz).

(d) One comparison cycle has a duration of 130 ns (clock signal C1=7680 kHz).

Initially, all comparisons for channel 1 are made. First, byte B1 (n) CH.1 is fetched and compared to an 8-bit window, which is shifted through 192 different positions from byte B1 (n−2) CH.1 through byte B1 (n−1) CH.1. During this time interval only one byte of the next frame is stored, i.e. B1 (n+1) CH.1. Thereafter, byte B2 (n) CH.1 is fetched and used in 192 comparison operations, this time with a window shifted from B2 (n−2) CH.1 through B2 (n−1) CH.1. The intermediate results thus gained are accumulated with those already available to obtain 192 new intermediate results. During this time, a single further byte for the next frame is stored, i.e. B1 (n+1) CH.2. This proceeds for channel 1, as shown in Table II, until all 24 bytes are correlated and the result for channel 1 is available in storage.

Thereafter, correlation for channel 2 is started. Storing is effected synchronously but serving all channels cyclically.

Correlator and Result Storage

Figure 5:
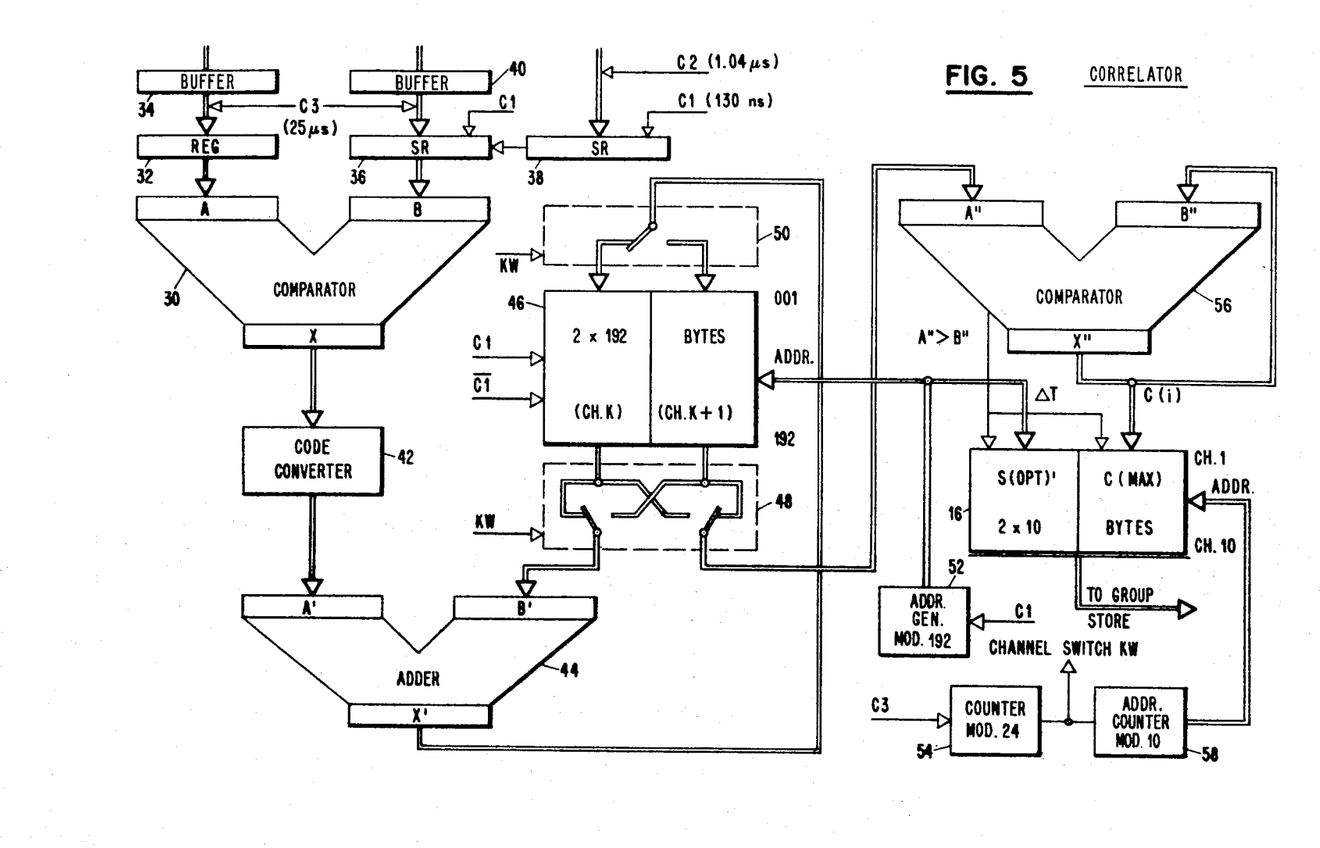
FIG. 5 shows a block diagram of the correlator, including a result storage, according to FIG. 3.

Detals of correlator 14 and the results in storage 16 of FIG. 2 are shown in FIG. 5 and will now be explained. Table II will help to clarify the procedure.

Comparison for correlation is made byte wise in a comparator 30 which consists e.g. of eight exclusive-OR circuits. The 8-bit output field at X indicates in which bit positions 8-bit input fields A and B contained equal binary values. At input A there is an 8-bit register 32 with an input buffer 34. At input B there are two connected shift registers 36 and 38 which can be loaded in parallel. Register 36 also has an input buffer 40. Operation of these input registers will be explained further below. A code converter 42 (read only storage or coding tree) is connected to the output of comparator 30. It converts the 8-bit comparison result into a digital representation which indicates the number of matching bits in fields A and B, i.e. a count value of 0 . . . 8.

An adder 44 and a storage 46 comprising two equal areas are provided for accumulation of the correlation values C(i), separate for each normalized offset value S' (with S'=S—192). Input A' of the adder is connected to the output of code converter 42. Input B' can be connected through a first switching unit 48 selectively with the output of each one of the halves of storage 46, and output X' can be connected through a second switching unit 50 selectively with the input of the respective half of storage 46. Each of the two storage halves comprises 192 byte positions each including 8 bits.

An address generator 52 is provided for cyclically and sequentially addressing all storage positions of both halves. A modulo-24 counter 54 is advanced by each pulse of clock signal C3 (after each 25 μs interval), i.e. each time when a new comparison cycle for one byte is started. After 600 μs, i.e. after 24 comparison cycles. This counter issues a signal "channel switch" KW which is furnished to switching units 48 and 50.

A comparator 56 is used for selecting the largest correlation value from the 192 values collected for a channel in storage 46. This comparator furnishes at its X" output the larger one of the two values which are applied to inputs A" and B". (If both values are equal, the value from input B" is transferred to the output). In addition, it furnishes on a separate line a control pulse if A">B". Input A" is connected through switching unit 48 with the output of one of the halves of storage 46 (the one which is just not connected to the adder). A connection from output B" leads back to input B" as well as to the data input of result storage 16.

Result storage 16 comprises two blocks, each including 10 byte storage locations, for retaining the optimum offset values S(OPT)' and the maximum correlation values C(MAX) for the 10 input channels. The data input for one of the storage halves (S'-values) is connected to the output of address generator 52. The data input for the other storage half (C-values) is connected to the X"-output of comparator 56. At any one time, one pair of byte position is addressed by addressing circuit 58 which cyclically and sequentially issues one of the ten possible addresses and which is switched by an output pulse of counter 54 (channel switch KW). In addition, this storage is connected with the line for control signal A">B". When such a control pulse occurs the address just furnished by address generator 52 is stored as S'-value into the storage location which is addressed by addressing circuit 58. The output of result storage 16 is connected to a collective storage which is described further below in connection with FIG. 7.

OPERATION OF THE CORRELATOR

As was mentioned already, the correlator shown in FIG. 5 is used in time division multiplex for 10 input channels. The correlation for one speech segment (6 ms time frame) of one input channel is always completed before the next channel is handled.

For one channel comparison cycle or short "channel cycle," 600 μs (one tenth of the frame period), is available. During this time interval all partial correlation values for the 24 bytes of the present segment must be determined and accumulated. For one byte comparison cycle or short "byte cycle," 25 μs (1/24 of the channel cycle), is available. During each byte cycle the respective byte must be compared to 192 different subsections, each including eight bits, taken from the older stored speech segments of the same channel. For each elementary comparison thus about 130 ns are available (frequency 7680 kHz).

First, byte B1 (n) CH.1, i.e. the first of the 24 bytes of time frame n for channel 1, is loaded into register 32 and remains there for 192 elementary comparisons (25 μs). At the same time bytes B1 (n-2) CH.1 and B2 (n-2) CH.1 are loaded into register 36 and 38, respectively. Contents of registers 32 and 36 are compared and the result (a number between 0 and 8 which indicates the number of matching bits) appears at output A' of adder 44. Address generator 52 at first furnishes address 192 so that at input B' the contents of location 192 of the left storage area appears (presently being zero, but at a later time representing the value accumulated thus far). The result from output X' is written into the left part of the storage location 192.

In storage 46, first a read operation and then a write operation are executed during one elementary comparison time of about 130 ns using the available address. Clock signals C1 and $\overline{C1}$ which have a time shift of one half interval are used for timing.

Storage locations 192 . . . 001 are associated to offset values S, ranging from 384 down to 193 (this corresponds to normalized offset values S' ranging from 192 down to 001). The two 8-bit group which are first compared have an offset of 12 ms, i.e., 384 bits.

After 130 ns the content of registers 36 and 38 are shifted to the left by one bit due to clock signal C1. Simultaneously the address in generator 52 is decremented by one to 191. The next comparison is made and the result is added to the content of the storage location 191 which is associated to bit offset S=383 (or S'=191, respectively).

After eight comparison operations the original contents of register 38 is now in register 36, and register 38 is loaded with byte B3 (n−2) CH.1 fetched from input storage 12.

Due to reloading of register 38 with a new byte each time after eight elementary comparison intervals, i.e. reloading by clock signal C2 after each 1.04 μs, continuous shifting of the eight bit wide comparison window by 192 bit positions in total becomes possible. During the last comparison using byte B1 (n) CH.1 in register 32, the partial result is written into storage location 001 which is associated to offset S=193 (or S'=001, respectively).

Now the second "byte cycle" starts by loading byte B2 (n) CH.1 into register 32 where it remains for 25 μs or 192 comparisons, respectively; at the same time bytes B2 (n−2) CH.1 and B3 (n−2) CH.1 are loaded into registers 36 and 38, respectively. Address generator 52 simultaneously starts with address 192. Thereafter, 192 elementary comparison are made as described above, while 23 bytes are reloaded into register 38, and the 192 storage location in storage 46 are addressed.

After a total of 24 byte cycles or 4608 elementary comparisons storage 46 contains the 192 correlation values which correspond to the comparison of segment n from channel number 1 with 192 different window subsections from the two stored older segments.

A switching is now effected by the signal "channel switch KW" of counter 54 for determining the maximum correlation value and the corresponding optimum offset S (or the normalized offset S', respectively) which corresponds to the pitch (basic tone) of the speech signal. Due to the switching the output of the left part of storage 46 is connected to comparator 56. At the same time, the right part of storage 46 is connected to adder 44 so that in the following "channel cycle" of 600 μs duration correlation data of channel 2 (or channel K+1 respectively) can be accumulated in this storage part. Simultaneously, the maximum value is selected by comparator 56 from the correlation values of channel number 1 (or channel K respectively) which are available in the left storage part.

Due to sequential addressing by address generator 52 one value after the other is transferred to input A" of comparator 56. During the whole channel cycle address circuit 58 selects in result storage 16 that double byte position which is associated to channel number 1 (or channel K, respectively).

This double storage location contains the maximum correlation value and the corresponding normalized offset value S' (which corresponds to the address of the correlation value in storage 46) which was found thus far. When the next correlation value appears at input A" it is compared to the present maximum which is available at input B". If the new correlation value is larger, it appears at output X" and at input B", and in addition it replaces, together with its previous address, i.e. the associated S'-value, the couple of values which was stored in storage 16. Alternatively the previous values in storage 16 and at input B" remain unchanged. At the end of the respective channel cycle the double location in storage 16 which is associated to channel number 1 contains the values C(MAX) and S(OPT)' for the n-th segment (n-th time frame) of channel number 1.

In the same way as just described, the normalized optimum offset values S(OPT)' and the corresponding correlation values C(MAX) for the last received 6 ms speech signal segment of each of the ten respective channels are collected in result storage 16 during ten channel cycles, i.e. during one time frame interval of 6 ms. These data can now be used for a redundancy reduction according to the invention by selectively suppressing speech segments during transmission.

Transmitter Arrangement and Selective Suppression of Segments

Figure 6:
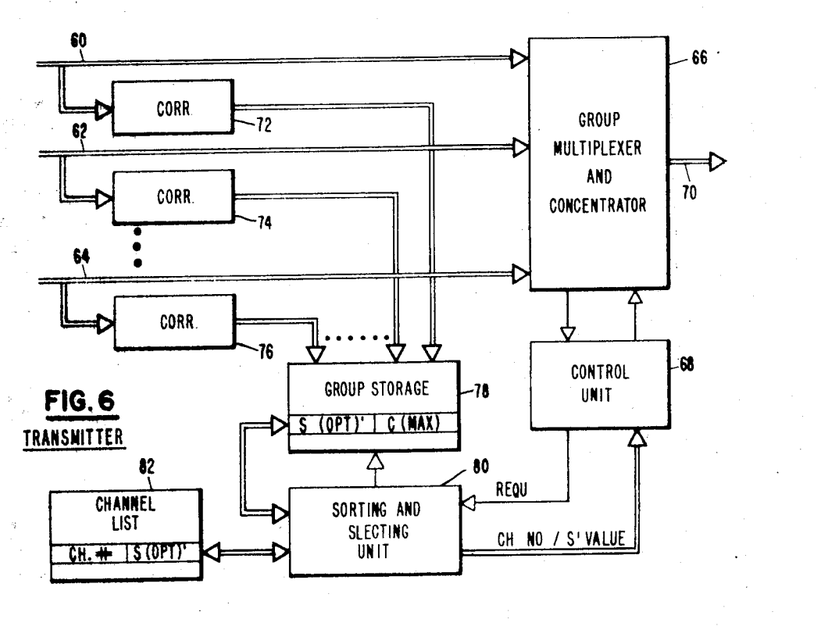
FIG. 6 shows a block diagram of a transmitting arrangement for combining several groups of speech signal channels, including means for according to the invention.

A transmitter arrangement for combining a plurality of input voice channels on a common transmission channel, in which the present invention is utilized, as shown as block diagram in FIG. 6.

A plurality of busses 60, 62, 64, each of which has its origin in one input storage 12 (FIG. 3) and transmitts the delta coded speech signals for ten input channels, is connected to a group multiplexer 66. This multiplexer is controlled by control unit 68 and combines the signals for e.g. 6 groups each comprising ten channels for transmitting them over transmission bus 70, which is called trunk line for short in the following. Signals on the trunk line are also organized in time frames of 6 ms each, each frame comprising a header which includes control and status information.

The group multiplexer may contain concentrating equipment so that the number of channels on trunk line 70 can be smaller then the sum of channels of group lines 60 . . . 64. If, despite this concentrating means the transmission capacity is fully utilized, so that signals from input channels must be refused or reduced by so-called "freezeout," additional transmission capacity can be set free with the aid of the present invention. The method of the invention can be used, however, on its own for redundancy reduction independently of such concentrating means.

Each of the channel groups has correlation means 72, 74, 76 comprising result storage in accordance with FIG. 3 and FIG. 5. Common group storage 78 accepts the contents, i.e. values C(MAX) and S(OPT)' for one time frame, from all result storage units. A sorting and selecting unit 80 sorts all correlation values by magnitude and generates in storage 82 a list of channel numbers and associated normalized offset values S(OPT)' in the order of descending correlation value. Thus, this list contains at its top the values of those channels which are most suited for suppression of a speech signal segment. A new list is generated after each time frame.

If now control unit 68 of group multiplexer 66 detects the necessity for additional channel capacity it sends a request signal which also indicates the number of required channels, to the sorting and selecting unit 80. This unit fetches the respective number of channel addresses and associated offset values from list storage 82 and furnishes them to control unit 68. The control unit inserts the channel numbers and S(OPT)'-values of the segments which are to be suppressed into the adder of the next frame, while it does not insert the respective speech segments proper into the next frame.

The association between input channels (bus lines 60, 62, 64) and trunk channels, which can change from frame to frame and the respective signalling technique, e.g. by an association mask in the frame header, need not be described here, because they are already described, e.g. in the U.S. patents mentioned previously.

For any speech signal, suppression of a segment must occur at most in every third time frame, because the two previous segments are necessary in the receiver for regeneration of a suppressed signal. Sorting and selecting unit 80 thus eliminates each channel which was selected for segment suppression, during the next two frame cycles from the sorting operation, so that it can not appear in list storage 82 for selection.

Following schedule indicates in which status and where the data of four consecutive time frames are to be found during one frame cycle in the transmitting arrangement. The flow of processing is so organized, that the speech segments proper and the respective selection data for the selective suppression of single segments are simultaneously available in group multiplexer 66.

The time relations during storage, correlation evaluation, and transfer of speech signal segments are as follows:

For frame n+1: Writing into input storage 12;

For frame n: Correlation evaluation and collection of values in result storage 16;

For frame n−1: Transfer of all result data into group storage 78, generation of a list sorted by correlation value and input into list storage 82;

For frame n−2: Request for additional channel capacity by storage unit 68; fetching of channel data for the most suited channels from list storage 82 and furnishing them to storage unit 68 for generating a frame header for the trunk line; speech signal bytes fetched from input storage unit 12 are also loaded into buffer stores of group multiplexer 66.

All the above operations are executed during one frame cycle.

Receiver Arrangement and Reinsertion of Suppressed Speech Segments

Figure 7:
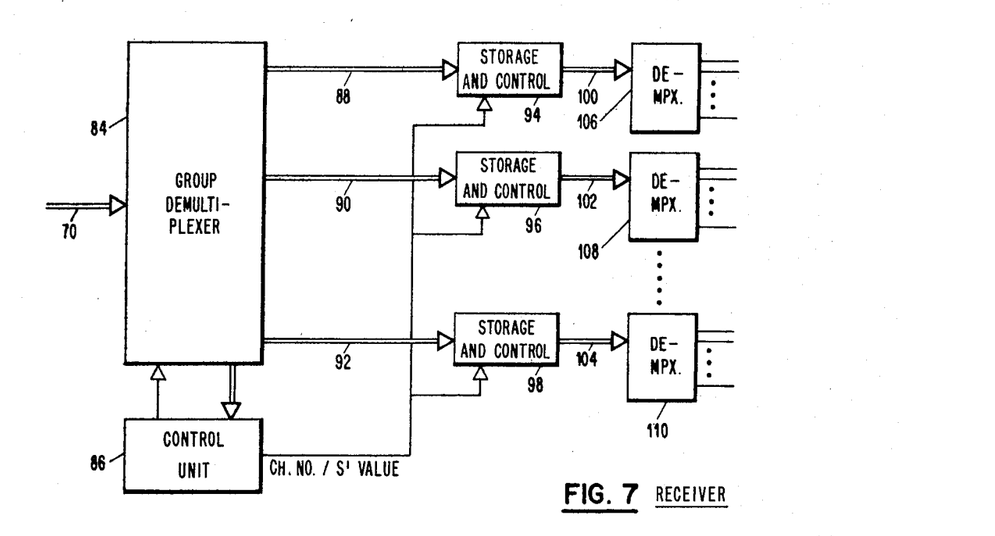
FIG. 7 shows a block diagram of a receiving arrangement including demultiplexers and speech signal storage means for restoration of signals according to the invention.

FIG. 7 is a block diagram of a receiver arrangement by which the signals which were transmitted in time devision multiplex over a trunk line can be distributed to several groups. Trunk line 70 is connected to a group demultiplexer 84 having a control unit 86, which distribute the speech signal segments which were received in frames of 6 ms duration to a plurality of bus line 88, 90, and 92. Each bus line is connected to one of storage units 94, 96, and 98, which have a capacity of at least 960 bytes, so that they can store for each of ten channels four speech segments each including 24 bytes. Each of the storage units of which one is shown in more detail in FIG. 8 comprises, in addition, storage means which are connected by separate line to control unit 86 of the group demultiplexer.

The storage units are connected through output bus lines 100, 102, 104 to demultiplexers 106, 108, 110, each of which has ten outputs for one channel each. For each single output channel, buffer registers and a decoder are provided which, however, are not shown here.

The control information from the header of each incoming frame is transferred to control unit 86 which, on the basis of the channel association mask recognizes the present association between trunk line channels on one hand and the channels on group bus lines 88, 90, 92 on the other hand and which controls the group demultiplexer respectively. The respective procedure need not be described in detail, because examples are described in the U.S. patents mentioned previously. For each channel of which a speech segment was suppressed, the associated channel number and the respective normalized optimum offset value S(OPT)' are transferred to the storage unit of the respective channel group.

Figure 8:
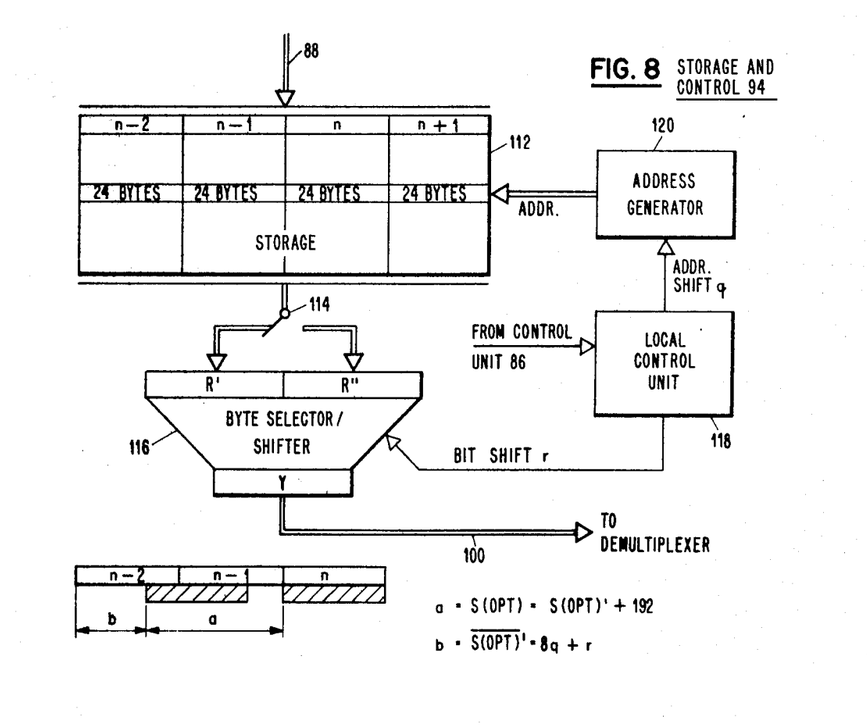
FIG. 8 shows a block diagram of a storage unit according to FIG. 7 including control and processing means for reinserting suppressed speech signal segments.

Reinsertion of the suppressed speech segments on the basis of this information is now described in connection with FIG. 8.

A storage unit 112, having a capacity of 960 or 1024 bytes, is connected to bus line 88. Its output is connected through a switching/selecting unit 114 to a byte selector/shifter 116. The latter has two 8-bit input registers R' and R" and transfers an 8-bit group (window) selected from these registers to an output register Y, which is connected to demultiplexer 106 via bus line 100. The offset value for selection of a window (a number between 0 and 8) is transferred to the byte selector/shifter 116 from a local control unit 118 through a control line. The local control unit is also connected to an address generator 120 which generates the write and read addresses for storage unit 112.

Operation is as follows: While newly received bytes are written into the storage locations for frame n+1, bytes are read from the storage location of frame n. Here again, addressing sequence is different for writing and reading, as shown in FIG. 4.

If a segment was not transmitted and thus is not contained in the storage block for frame n, it must be replaced by a signal subsection (window) which is fetched from the storage block for frame (n−2) and (n−1), and the received value S(OPT)' is used for the selection. As shown in FIG. 8, the value S(OPT)=S(OPT)'+192 determines the offset between the missing segment and the desired replacement segment (signal subsection from two older segments) while the complement $\overline{S(OPT)'}$ indicates the distance of the replacement segment from the left segment boundary. This distance (8-bit word) contains a value q (the first 5 bits) for finding the initial byte, and a value r (the last 3 bits) for indicating the starting bit within the selecting byte. For obtaining a replacement byte Y during read-out operation one fetches first two consecutive bytes B(k) and B(k+1) from the storage areas for B(n−2) and B(n−1), respectively, with the aid of byte address value q which is furnished to address generator 120 by the local control unit. From these two bytes in registers R' and R" the hardware shifter 116 selects one 8-bit group, i.e. Y, which is furnished as a portion of the replacement segment to bus line 100. In order to simplify control, also normal bytes are fetched from storage block n through byte selector/shifter 116. For normal bytes, however, values q=0 and r=0 are used, so that the byte read-out is set into register R' and transferred from there directly into register Y.

The rule thus is: if for a channel a segment was really transmitted fetching is effected from storage area n, using q=0 and r=0. If a segment was not transmitted and thus must be replaced in the receiver, fetching is from storage areas n−2 and n−1, respectively, using offset value 8q+r=$\overline{S(OPT)'}$.

For storing a new byte and for fetching a double byte (as a basis for obtaining a single shifted byte) one storage cycle ("byte cycle") of 25 μs is available, to allow within one frame cycle of 6 ms the storing of 24 bytes and fetching of 24 bytes for all ten channels of the group. Within one byte cycle (25 μs) thus two read accesses and one write access must be executed in storage unit 112.

Normalization and Coding

It was assumed for the described embodiment that each speech signal is coded by an adaptive delta coder. Due to adaptive delta coding, essentially same bit sequences are obtained for equal signal forms, even if signals of equal form have different amplitudes. Therefore, a normalization of signals before correlation is not necessary.

The principle of the invention can be utilized, however, not only in connection with delta modulation, but also with other coding principles, e.g. with PCM (pulse code modulation). Before the correlation procedure according to this invention, a normalization procedure may be necessary, if such normalization is not anyway inherent in the coding principle used.

While the invention has been particularly shown and described with reference to the preferred embodiment thereof, various changes in form and detail may be made therein without departing from the spirit and scope of the invention.

Having thus described our invention, what we claim as new, and desire to secure by Letters Patent is:

1. A method for coded transmission of speech signals, in which selected portions of a speech signal are not transmitted and are replaced in the receiver by stored previous portions of the same speech signal, the processing of a speech signal, comprising:
   generating periodically a new fixed-length coded speech segment while at least the two last-previous segments are kept in storage in the transmitter;
   determining in the transmitter in each frame period, the best correlated signal subsection of segment length within the stored previous segments, and its offset, both with respect to the new segment;

suppressing selectively a whole segment from transmission and transmitting instead an indication of the offset for the best correlated previous signal subsection; and storing in the receiver, at least the two last-previous segments and replacing a suppressed segment by the best correlated subsection of the stored segments in response to the received offset indication.

2. The method of claim 1, which further comprises:

combining in a group, speech signals of a plurality of channels;

generating and storing for each speech signal of said group an indication for the magnitude of the correlation between the newest coded speech segment and the best correlated previous signal subsection; and selecting for any one frame period, less than a few speech signals having the highest actual correlation values for suppression of a segment during transmission.

3. The method of claim 2, wherein for any given speech signal, at most every third coded speech segment is suppressed during transmission, so that prior to each suppression of a segment, at least two segments are actually transmitted.

4. The method according to claim 2, wherein for the newest coded speech segment of each speech signal, correlation magnitude indications are generated and stored for at least all those offset values, which are possible on the basis of a given shift increment and which are greater than one frame period and less than two frame periods, and that thereafter the largest correlation value is selected and stored together with an indication for the corresponding offset value.

5. An apparatus for coded transmission of speech signals, in which selected portions of a speech signal are not transmitted at a transmitter and are replaced in a receiver by stored previous portions of the same speech signal, comprising:

generating means connected to a speech signal source for periodically generating a new fixed-length coded speech segment while at least the two last-previous segments are stored in the transmitter;

means in said transmitter, connected to said generating means for determining in each frame period, the best correlated signal subsection of segment length within the stored previous segments, and its offset, both with respect to the new segment;

means in said transmitter connected to said determining means for selectively suppressing a whole segment and transmitting instead an indication of the offset for the best correlated previous signal subsection; and means in said receiver for storing at least the two last-previous segments and replacing a suppressed segment by the best correlated subsection of the stored segments in response to the received offset indication.

6. The apparatus of claim 5, wherein said determining means further comprises:

common correlation means for a plurality of speech signal input channels, comprising an input storage and a result storage; and means for stepwise generation and accumulation of correlation values for one frame period.

7. The apparatus of claim 6, wherein said suppressing means further comprises:

an intermediate storage means for accumulating, for the interval of one frame period and for at least one speech signal input channel, a multiplicity of correlation values for a corresponding multiplicity of different offset values; and comparing means which are connected to said intermediate storage means and said result store for selecting, by a number of compare operations, the largest of the accumulated correlation values and for storing it together with the corresponding offset indication in said result store.

8. The apparatus of claim 7, wherein said intermediate storage means further comprises:

a storage unit comprising two equal storage areas and switch over means by which one of the storage areas can be connected to means for generating a multiplicity of correlation values, and by which the respective other storage area can be connected to said comparing means for selecting the largest correlation value.

* * * * *